United States Patent [19]

Hooke

[11] 4,407,911

[45] Oct. 4, 1983

[54] RECHARGEABLE ELECTROCHEMICAL CELL PACK HAVING RESISTANCE TO IMPACT AND VIBRATION

[75] Inventor: John W. Hooke, Gainesville, Fla.

[73] Assignee: General Electric Company, Gainesville, Fla.

[21] Appl. No.: 192,826

[22] Filed: Oct. 1, 1980

[51] Int. Cl.³ .............................................. H01M 2/10
[52] U.S. Cl. ....................................... 429/94; 429/99; 429/159
[58] Field of Search ...................... 429/4, 159, 96–100, 429/94; 339/152

[56] References Cited

U.S. PATENT DOCUMENTS

| | | | |
|---|---|---|---|
| 3,219,485 | 11/1965 | Foecking et al. ...................... | 429/99 |
| 3,565,690 | 2/1971 | Plessix ................................... | 429/94 |
| 3,623,917 | 11/1971 | Chassoux .............................. | 429/99 |
| 3,665,285 | 5/1972 | Mullersman ........................... | 320/2 |
| 3,741,428 | 6/1973 | Evjen .................................... | 220/18 |
| 3,810,790 | 5/1974 | Denis .................................... | 429/158 |
| 3,850,776 | 11/1974 | Karobath et al. ................... | 429/4 X |
| 3,977,907 | 8/1976 | Roth ..................................... | 429/7 |
| 4,125,681 | 11/1978 | Sjogren ............................ | 429/159 X |

Primary Examiner—Anthony Skapars
Attorney, Agent, or Firm—Henry J. Policinski

[57] ABSTRACT

A rechargeable electrochemical cell pack is provided having improved resistance to impact and vibration. The cell pack includes a plurality of rechargeable electrochemical cells integrally combined with a cell pack casing. A casing cover is provided having a plurality of interior cover lug projections selectively positioned for registration with the individual electrochemical cell top covers. The casing cover is united to the individual cells and to the casing base by a sonic welding procedure.

14 Claims, 6 Drawing Figures

RECHARGEABLE ELECTROCHEMICAL CELL PACK HAVING RESISTANCE TO IMPACT AND VIBRATION

FIELD OF THE INVENTION

The present invention relates to rechargeable electrochemical cell packs and, more specifically, to rechargeable electrochemical cell packs having improved resistance to impact and vibration.

BACKGROUND OF THE INVENTION

Rechargeable electrochemical cells are enjoying increasing use. Typical of these cells is the sealed spiral wound lead acid cell. This cell can provide long term operation, is substantially maintenance free and offers a high capacity per unit volume. It is also light in weight and rugged in construction, making it especially suited for portable operations.

In view of its beneficial characteristics, the electrochemical cells being described are frequently used in portable arrangements termed "cell packs". Cell packs are groups of electrochemical cells electrically interconnected, in series, parallel, etc., to provide sources of electrical power of varying voltage and rating. Cell packs are now also provided with recharging capability in view of the rechargeability of the component cells. All of these features making cell packs useful for powering a variety of consumer and industrial devices, such as portable televisions, portable flashlights, electric saws and the like.

As the use of rechargeable cell packs expands, so does the need for providing cell packs of greater durability.

Among the problems that can be encountered is the interruption of the cell pack inner circuitry due to sudden impact or exposure to undue vibration. Frequently, because of the portable nature of the packs, they are jolted or jarred during normal use. These collisions can cause undue movement or shifting of the interior cells and can entirely disrupt or short the circuitry, causing the pack to become inoperative and possibly limiting its further use. Frequently also, the constant vibration can cause the inner cell connections to fatigue and eventually break, again limiting the usefulness of the pack.

Repairing broken cell connections can be quite difficult. The packs are generally considered maintenance free and as a result, they usually are not adapted to easy repair. Moreover, among the advantages of these packs is that they can be stored in "out of the way" places in electrical apparatus, permitting the apparatus to be more compact, etc. This however makes access to the cell pack for repair even more difficult and again detracts from the usefulness of the pack.

In view of these difficulties, disrupted or broken interior cell pack connections can motivate the user to replace the entire pack rather than face the difficulty of repair.

One technique for increasing the impact and vibration resistance of electrochemical cell packs is to cement or glue the cells to the casing in an attempt to prevent cell movement or shifting. This alternative, however, can require complex manufacturing procedures and the need for additional materials. Cementing might even require serious modification or even a reconstruction of the individual cells, making the operation even more complex.

Encasing the cells in a vibration resistant material might also be considered. Here again however additional materials would be needed and the additional packing might detract from the desirable compactness of the overall pack.

The foregoing conditions highlight the need for providing a rechargeable electrochemical cell pack which is impact and vibration resistant, compact in size, and which can be fabricated without undue difficulty. It would be further desirable to provide a method for fabricating such an impact resistant electrochemical cell pack from readily available electrochemical cells, without the need for serious modification of the cells or the need for fabrication of new cell structures.

Accordingly, it is an object of the present invention to provide a rechargeable electrochemical cell pack which is impact and vibration resistant, compact in size, and capable of being fabricated in an efficient, economical and convenient manner.

Another object of the invention is to provide a method of making vibration resistant cell packs using commonly available sealed electrochemical cells, without the need for substantial modification of the cells, or the use of complex assembly operations or undue additional materials.

These and other objects of the invention will become apparent from the following summary and description of the invention taken in conjunction with the accompanying drawings.

SUMMARY OF THE INVENTION

Broadly contemplated, the present invention provides an impact and vibration resistant rechargeable electrochemical cell pack. The cell pack comprises: a casing; a plurality of rechargeable electrochemical cells mounted in the casing, the plurality of electrochemical cells each being in integral connection with the casing; and means at the interior of the casing for interconnecting the electrochemical cells in an electrical circuit, the electrical circuit also having exterior positive and negative leads.

In preferred embodiments the electrochemical cells are the generally available sealed spiral wound rechargeable cells. The integral connection between the electrochemical cells and the casing is adapted to the use of at least one and preferably a plurality of lug projections which extend interiorly from the casing cover and are sonically welded to electrochemical cell top covers. The cells are electrically connected by means of electrical conductive straps welded to the respective individual cell terminals after the bulk of the terminals are specially shaped to accommodate the interconnections. The exterior positive and negative leads for the cell pack extend outwardly through the casing for connection with external devices for both charging and discharging modes.

In accordance with the invention, the cell pack is fabricated by integrally connecting the plurality of electrochemical cells to the casing cover. This is accomplished by sonically welding lug projections extending interiorly within the casing cover to the top portions of the individual cells to integrally connect the cells to the casing cover. The casing cover is, in one embodiment, thereafter integrally connected to the casing base to form a unified impact and vibration resistant cell pack structure.

DETAILED DESCRIPTION OF THE INVENTION

Figure 1:
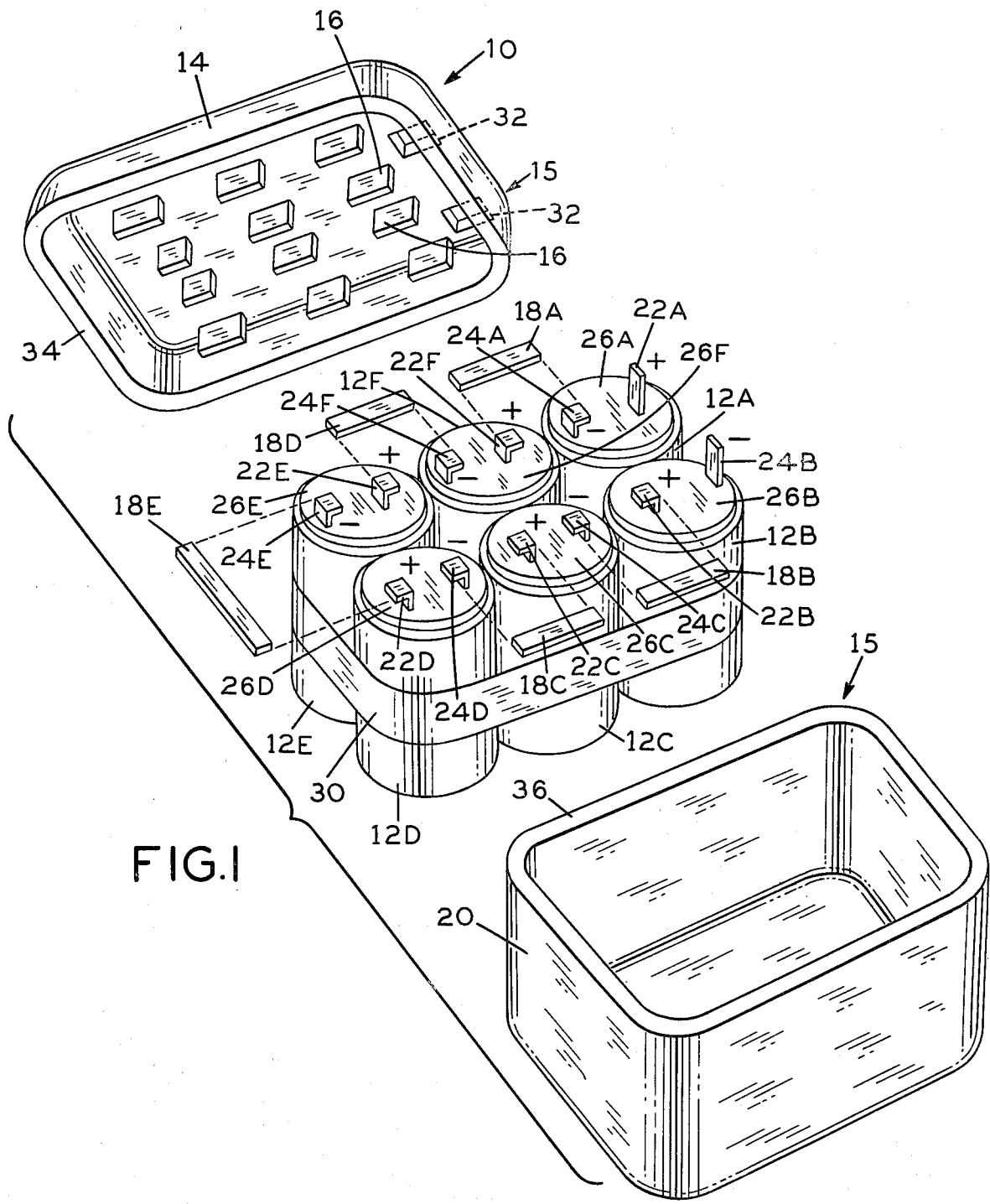
FIG. 1 is a view of the cell pack of the invention in exploded perspective showing the particular parts, some of which prior to assembly.

Referring now to the drawings wherein like numerals are used to indicate like parts throughout the various figures, FIG. 1 illustrates an exploded view of the preferred form of rechargeable cell pack 10 of the invention. It is understood that the term "cell pack" denotes a unitary package including two or more individual electrochemical cells which are electrically interconnected, usually in series. Cell pack 10 is a rechargeable system capable of providing electrical power for a wide variety of purposes. Depending upon the number of internal individual cells and their manner of interconnection, any of a wide variety of voltages and current ratings can be provided.

For purposes of illustration, six electrochemical storage cells are shown in cell pack 10 although a different number of cells can be used. The individual electrochemical cells preferred for use in the invention are the conventional rechargeable sealed lead acid cells. A typical cell of this type is the D size sealed lead acid cell commercially available from the General Electric Company, the assignee herein. These cells have a capacity rated at 2.5 ampere hours at the "10 hour" rate and a nominal operating voltage of 2.00 VDC. Thus, the overall terminal voltage for cell pack 10 using six of the cells arranged in series connection will be about 12.00 VDC. It will be understood, of course, that the invention is applicable to cells of different sizes and ratings to produce cell packs of differing terminal voltages and ratings.

The aforementioned lead acid cells of the spiral wound type are of rugged construction. These cells are fully sealed and make use of a cylindrical spiral wound plate design which provides high current density and low internal impedance, and can be operated, i.e., charged and discharged, in any positioning arrangement, i.e., sidewards, upside down, etc. These cells typically include spaced apart spiral wound positive and negative lead plates (not shown) comprised of a grid-like construction. The grid structure is generally filled with the active materials to form either positive (generally lead oxide) or negative (generally sponge lead) electrodes. Sandwiched between the plates is a thin porous separator. The typical cell being described also includes an upper plastic cover which serves to fully seal the contents of the cell and to prevent the loss of fluids and gases. The cells are usually housed in a metal container which is fully insulated from the inner plates to avoid short circuiting. All of these features making the cells rugged and durable.

For a detailed view of the sealed lead acid cells being described, as well as a discussion of their charge and discharge characteristics, reference is made to the User's Guide for Rechargeable Sealed Lead Acid Cells, published by the General Electric Company, Battery Business Department, Gainesville, Fla.

Referring again to FIG. 1, it will be seen that cell pack 10 is generally rectangular in shape, having its shape primarily determined by the size and number of individual cells employed and the positioning arrangement of the cells. Although a number of positioning arrangements can be adopted, the preferred arrangement is shown in FIG. 1. According to this arrangement the cells are positioned in abutting or nearly abutting relation in two groups of three. The positive and negative terminals 22 and 24, respectively, of the individual electrochemical cells are positioned to extend upwardly with terminals of adjoining cells being of opposite positive and negative polarity. This arrangement facilitates series inter-connection between the cells, which is readily effected by affixing conductive straps 18 longitudinally in contact with adjoining cell terminals as shown in FIG. 1.

The individual cell terminals 22B through 22F; 24A and 24C through 24F (alphabetical letters follow character numbers to identify individual cells and component parts of individual cells) are specially shaped in the form of an inverse "L" arrangement so that each of these terminals has a top portion arranged parallel to cell covers 26. This arrangement facilitates a secure interconnection between the cells using conductive straps 18. A common manufacturing procedure can be employed for shaping the inverse "L" in the subject terminals, making for increased manufacturing efficiency. Advantageously, shaping the terminals in the described manner is all that is required to adapt commercially available cells for use in the cell pack 10 of the invention.

Figure 4:
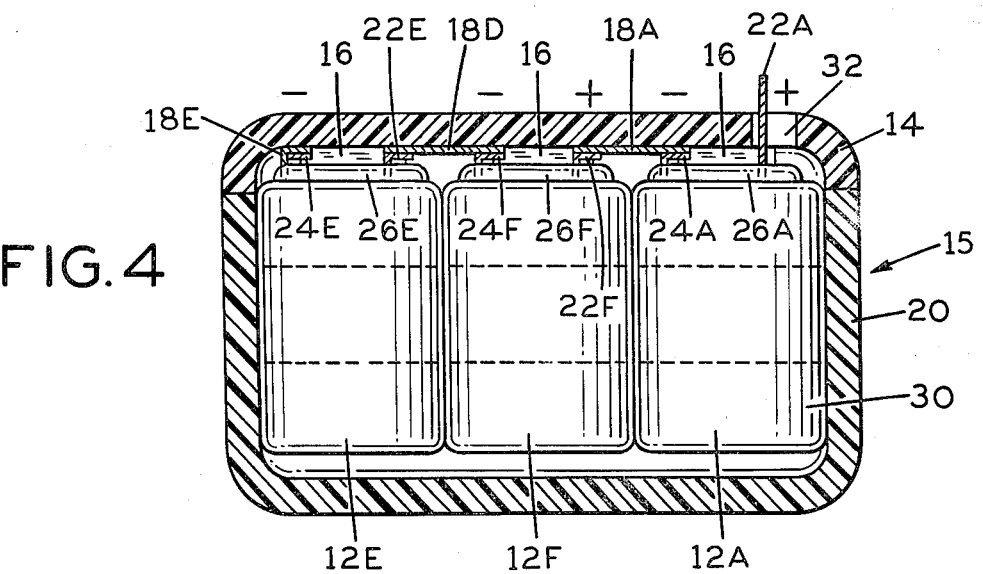
FIG. 4 is a cross sectional side view of the cell pack taken along line 4—4 of FIG. 2 showing the lug projections sonically welded to the electrochemical cell covers and the exterior cell pack positive lead extending through the casing cover.
Figure 5:
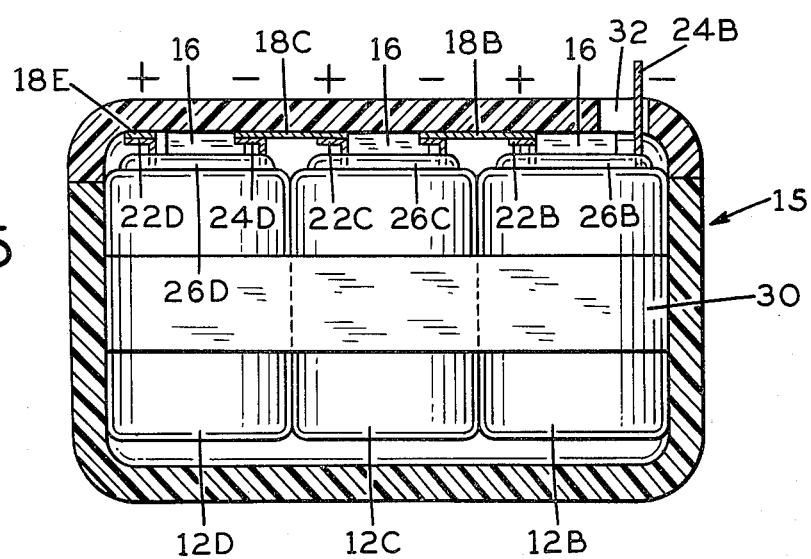
FIG. 5 is a cross sectional front view taken along line 5—5 of FIG. 2 showing lug projections sonically welded to the electrochemical cell covers and the exterior cell pack negative lead extending through the casing cover.
Figure 6:
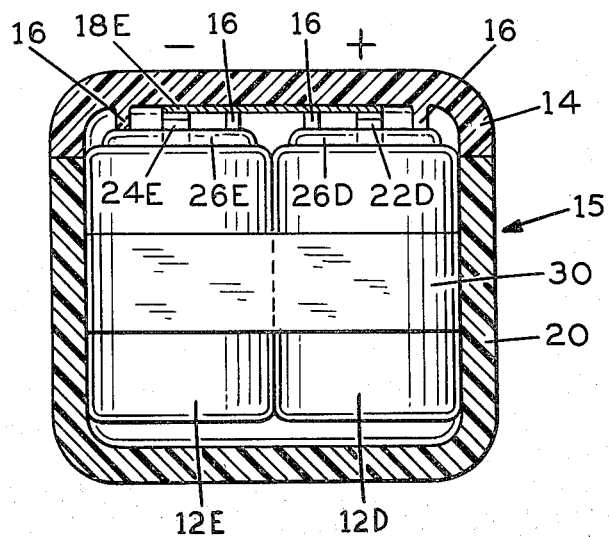
FIG. 6 is a cross sectional side view of the cell pack taken along line 6—6 of FIG. 2 showing the electrical connection between cells 12D and 12E and the lug projections in integral connection with these two cells.

As seen in FIGS. 1, 4 and 5, terminals 22A and 24B are not bent in the "L" shape. They remain in the upright position. These terminals are employed as the positive and negative outer leads for cell pack 10. They are adapted to extend through casing cover 14 by means of slots 32 for connection with either the apparatus to be powered or to suitable recharging equipment.

Referring again to FIGS. 1 and 2, five conductive straps 18A through 18E are employed to interconnect the six individual electrochemical cells 12. Conductive straps 18 are conventional and can simply be metal strips attached directly to the top portions of the L shaped terminals. Alternatively, conductive straps 18 can be supported in casing cover 14. In this way the conductive straps will connect the cells upon engagement with the casing cover.

Individual straps 18A through 18D can each be of uniform dimension, making for ready fabrication. Conductive straps 18E will be somewhat greater in length. Attaching the conductive straps can be done in any conventional manner such as by spot welding and the like.

To help prevent shifting during assembly and afterwards, cells 12 can be provided with a connecting band 30 made of, e.g., rubber or cloth.

As indicated earlier, circuit integrity in cell pack 10 is maintained even on exposure to impact or vibration. The individual cells are adapted to be firmly held in position so that circuit connection can remain undisturbed even on impact or vibration.

Figure 2:
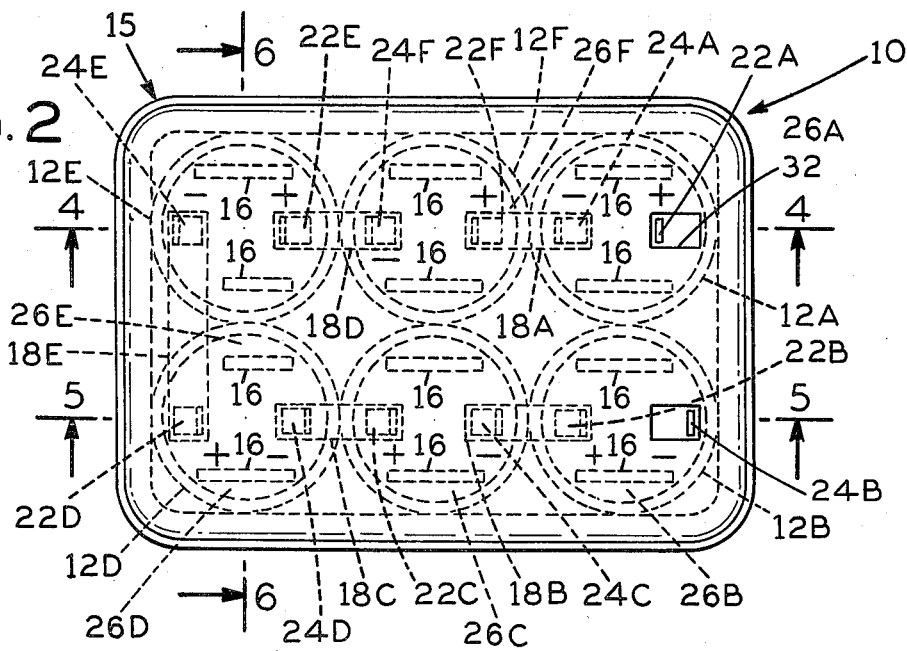
FIG. 2 is a plan view of the cell pack of the invention.
Figure 3:
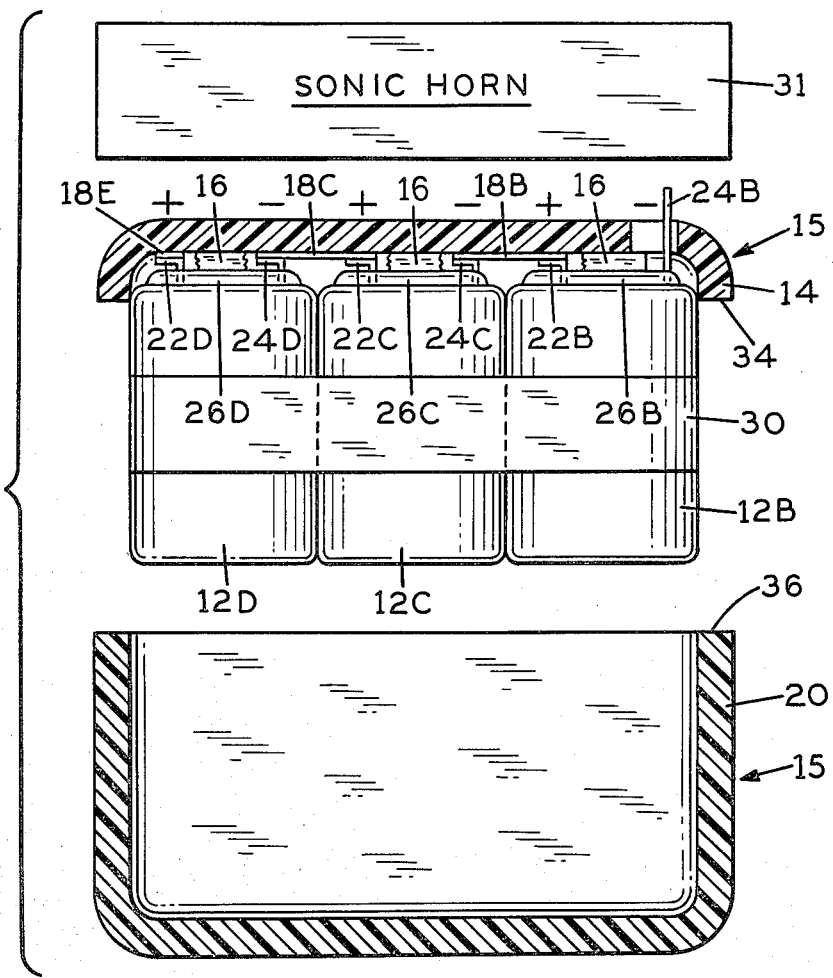
FIG. 3 is an exploded side view showing the individual electrochemical cells in integral connection with the casing cover and further showing the position of the cells for placement in the casing base. The conventional sonic horn used for sonically welding the structure is also shown in relative position.

Thus, considering now FIGS. 1, 2 and 3, casing 15 is provided having an upper cover 14 and a base 20. Generally, casing 15 can be fabricated from any material suitable for housing electrical equipment. For reasons that will soon be apparent, the casing material should be conducive to heating or sonic welding. One preferred material for the casing is phenylene oxide.

Casing cover 14 is provided with at least one and preferably a plurality of lug projections 16 which are selectively positioned interiorly in the casing cover 14 for registration with cells 12. Lug projections 16 can be formed during fabrication of casing cover 14 by conventional dye injection or blow molding techniques and the like.

As best seen in FIGS. 1 and 2, lug projections 16 are preferably arranged so that at least two projections are in registering relation with the plastic cell covers 26 of the individual electrochemical cells 12 upon engagement of cell cover 14 with the group of six interconnected cells 12. Lug projections 16 should be of sufficient size to ensure firm connection with cell covers 26 in the manner to be discussed hereafter.

As shown in FIGS. 3-6, cover lug projections 16 are integrally combined with the plastic cell covers 26. Among the techniques for accomplishing this is to sonically weld lug projections 16 with cell covers 26. Thus, referring specifically to FIG. 3, casing cover 14 is positioned onto the group of six interconnected electrochemical cells 12 and a sonic horn 31 is placed into contact with casing cover 14. Sonic horn 31 is conventional and is a device adapted to impart sonic vibration. The individual lug projections 16 now in contact with respective cell covers 26 are vibrated by means of sonic horn 31 against cell covers 26. As a result, frictional heating at the interface between lug projections 16 and the respective cell covers 26 ensues. After sufficient frictional heating, the bottom portions of lug projections 16 and the frictionally contacted portions of cell covers 26 each become partially melted, such melting resulting eventually in a unification of lug projections 16 with cell covers 26. After sufficient time for sonic welding, and upon cooling, cell covers 26 and lug projections 16 are integrally united and hence casing cover 14 is integrally combined with each of the individual electrochemical cells 12.

As best seen in FIG. 3 the cell cover 14 united with electrochemical cells 12 are adapted for positioning in casing base 20. Thus, the group of six electrochemical cells 12 and cover 14 are placed into position in casing base 20. Casing cover edge 34 is thus made to contact casing base edge 36. Again sonic horn 31 is applied to casing cover 14; cover edge 34 is thus made to vibrate against casing base edge 36 resulting in a frictional heating and melting of the edges. After sufficient melting, and cooling, the edges 36 and 34 unite to form a unitary cell casing 15 having individual cells 12 integrally combined with casing 15.

Summarizing the manufacturing operation for cell pack 10, initially the individual electrochemical cells 12A-F have their respective positive terminals 22B-F and negative terminals 24A and 24C-F shaped in the "L" position to present the parallel top portions, as shown in FIG. 1. Negative terminal 24B and positive terminal 22A of cells 12B and 12A, respectively, remain upright. The six cells 12A-12F are arranged in abutting relation in two groups of three as shown in FIG. 1. The cells are positioned so that the closest terminals of adjoining cells have opposite positive and negative polarity. A connecting band 30 is provided to surround the six cells keeping them in position. Conductive straps 18A through 18E are spot welded to the respective cell terminals 22 and 24 to interconnect the cells as shown in FIGS. 1 and 2.

Cell cover 14 is thereupon placed into registering position onto interconnected cells 12A-12F. Lug projections 16, selectively positioned in casing cover 14, register onto the exposed areas of cell covers 26, two lug projections 16 per cell cover 26. Terminals 22A and 22B extend through slots 32 of casing cover 14 to form the outer cell leads for the cell pack as shown in FIGS. 4 and 5.

Turning again to FIG. 3, sonic horn 31 is placed onto cover 14 and is adapted to vibrate cover lug projections 16 against cell covers 26. As a result, a frictional heating at the interface areas between the lug projections 16 and the cell covers 26 ensues. After sufficient time, this heating causes the contacted interface portions of cell covers 26 and lower portions of lug projections 16 to partially melt and unite. Advantageously, any irregularities in the lengths of lug projections 16 due to variances in manufacturing tolerances, etc., which can cause cover 14 not to fit squarely onto cells 12 is corrected by operation of sonic horn 31 for sufficient time. After sufficient melting, sonic horn 31 is stopped. The melted lug interface portions and cell cover interface portions are permitted to cool and solidify, resulting in an integral unification between lug projections 16 and cell covers 26. By this procedure, each of the individual cells 12 is united with casing cover 14 to form a single unit as shown in FIG. 3.

Turning again to FIG. 1, after the cells are united with casing cover 14, the unit is placed into casing base 20. Cover edge 34 contacts base edge 36. Again, sonic horn 31 is applied to casing cover 14 and the cover edge 34 is made to sonically vibrate against base edge 36. Frictional heating occurs at the casing edges. After due time, there is melting at the edges and sonic horn 31 is removed. The melted edge portions then solidify, thus uniting cover 14 with casing base 20 to form a unified cell pack unit 10.

A cell pack is thus provided having the individual cells firmly interconnected with conductive straps 18 welded into position to connect the cells and assist in their positioning. The cells themselves are each integrally connected to a unified structure. The electrical interconnections of the cells are thus firmly established and protected from being unduly disturbed by cell shifting and the like.

In summary, the invention provides a compact rechargeable electrochemical cell pack wherein the individual cells are integrally connected to the cell pack casing. The cells are firmly united within the cell pack casing 15, thus providing a cell pack having cell connections which can withstand impact and vibration forces. The method for manufacturing the cell pack is efficient and adapted to impart a firm construction. It permits the use of commonly available rechargeable electrochemical cells without the need for undue modifications of such cells. The invention provides a technique adapted to accommodate standard manufacturing tolerances while maintaining the overall integrity of the intercell connections. Little or no additional materials such as cement or foam plastic are needed to provide the desired vibration resistance. In addition, the cell pack provided is compact in size and depends primarily on the dimensions of the individual electrochemical cells for its overall size and shape.

While I have shown in the drawings and have described in detail one preferred embodiment of the invention, it is to be understood that this description is an exemplification. Certain variations and adaptations can be made to the cell pack described above and its method of manufacture without departing from the spirit of the invention which is to be limited only by the scope of the appended claims.

What I claim is:

1. A rechargeable electrochemical cell pack comprising:
    a plurality of rechargeable electrochemical cells mounted in said casing, and said plurality of electrochemical cells each being in integral connection with said casing, said integral connection between each of said plurality of electrochemical cells and said casing comprised of at least one lug projection which extends from said casing and is integrally connected to each of said plurality of electrochemical cells; and
    means at the interior of said casing for interconnecting said casing for interconnecting said electrochemical cells in an electrical circuit, said electrical circuit having a positive lead and a negative lead.

2. The cell pack of claim 1 wherein said at least one lug projection is sonically welded to said each of said plurality of electrochemical cells.

3. The cell pack of claim 1 wherein said means at the interior of said casing for interconnecting said electrochemical cells includes at least one electrically conductive strap which is adapted to connect a terminal of a first of said plurality of electrochemical cells with a terminal of a second of said plurality of electrochemical cells.

4. The cell pack of claim 1 wherein at least one of said electrochemical cells has at least one terminal shaped in an inverse "L" for interconnection with a terminal of another of said electrochemical cells.

5. The cell pack of claim 1 wherein said plurality of electrochemical cells are sealed spiral wound rechargeable electrochemical cells having a top portion and a negative and a positive terminal extending outwardly through said top portion, said top portion being in integral connection with said casing.

6. The cell pack of claim 5 wherein said integral connection between each of said plurality of electrochemical cells and said casing is comprised of at least one lug projection which extends from said casing and is sonically welded to said top portion of each of said plurality of electrochemical cells.

7. The cell pack of claim 6 wherein said casing includes a plurality of lug projections, said top cover of each of said plurality of electrochemical cells being sonically welded to at least one of said plurality of lug projections.

8. The cell pack of claim 6 wherein said casing includes a plurality of lug projections, said top cover of each of said plurality of electrochemical cells being sonically welded to at least two of said lug projections.

9. In an electrochemical cell pack having a casing and a plurality of spiral wound electrochemical cells housed in said casing, said plurality of electrochemical cells having a top cover and positive and negative terminals extending through said top cover, the improvement comprising:
    said casing having a cover and a base;
    a plurality of lug projections extending from said cover and being sonically welded to said top covers of each of said plurality of electrochemical cells, each of said top covers of said plurality of electrochemical cells being sonically welded to at least two of said lug projections; and
    at least one conductive strap adapted to interconnect at least two of said plurality electrochemical cells in an electrical circuit, said electrical circuit having a positive lead and a negative lead.

10. The electrochemical cell pack of claim 9 wherein said cover of said casing is sonically welded to said base of said casing.

11. A rechargeable electrochemical cell pack comprising:
    a casing;
    a plurality of rechargeable electrochemical cells mounted in said casing, said plurality of electrochemical cells each being in integral connection with said casing, said casing including a plurality of lug projections, each of said plurality of electrochemical cells being in integral connection with at least one of said plurality of lug projections; and
    means at the interior of said casing for interconnecting said electrochemical cells in an electrical circuit, said electrical circuit having a positive lead and a negative lead.

12. The cell pack iof claim 11 wherein said plurality of lug projections are sonically welded to each of said plurality of electrochemical cells.

13. The cell pack of claim 12 wherein said casing includes a cover and a base and said plurality of lug projections are included in said cover.

14. A rechargeable electrochemical cell pack comprising:
    a casing;
    a plurality of rechargeable electrochemical cells mounted in said casing, said plurality of electrochemical cells each being in integral connection with said casing, said plurality of cells are sealed spiral wound rechargeable electrochemical cells having a top portion and a negative and a positive terminal extending outwardly through said top portion, said top portion being integral with said casing, said integral connection between each of said plurality of electrochemical cells and said casing is comprised of at least one lug projection which extends from said casing and is sonically welded to said top portion of each of said plurality of electrochemical cells; and
    means at the interior of said casing for interconnecting said electrochemical cells in an electrical circuit, said electrical circuit having a positive lead and a negative lead.

* * * * *